United States Patent
Chu et al.

(10) Patent No.: US 8,074,148 B2
(45) Date of Patent: Dec. 6, 2011

(54) MEMORY MANAGEMENT METHOD AND CONTROLLER FOR NON-VOLATILE MEMORY STORAGE DEVICE

(75) Inventors: Chien-Hua Chu, Hsinchu County (TW); Kuo-Yi Cheng, Taipei (TW); Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 791 days.

(21) Appl. No.: 12/186,711

(22) Filed: Aug. 6, 2008

(65) Prior Publication Data
US 2009/0248961 A1 Oct. 1, 2009

(30) Foreign Application Priority Data
Mar. 28, 2008 (TW) .............................. 97111547 A

(51) Int. Cl.
*G11C 29/00* (2006.01)

(52) U.S. Cl. ........................................ 714/763; 714/764

(58) Field of Classification Search .................. 714/763, 714/764
See application file for complete search history.

(56) References Cited

U.S. PATENT DOCUMENTS

| | | | |
|---|---|---|---|
| 7,493,457 B2* | 2/2009 | Murin ........................... | 711/157 |
| 7,774,681 B2* | 8/2010 | Earhart et al. ................ | 714/763 |
| 7,844,880 B2* | 11/2010 | Vainsencher et al. ......... | 714/764 |
| 7,849,382 B2* | 12/2010 | Kasahara et al. ............. | 714/763 |
| 2007/0089033 A1* | 4/2007 | Zeevi ............................ | 714/763 |
| 2007/0136639 A1* | 6/2007 | Guterman et al. ............ | 714/763 |
| 2008/0016430 A1* | 1/2008 | Yoshida ....................... | 714/764 |
| 2008/0072119 A1* | 3/2008 | Rozman ....................... | 714/763 |
| 2008/0184094 A1* | 7/2008 | Murray et al. ................ | 714/763 |
| 2010/0115376 A1* | 5/2010 | Shalvi et al. ................. | 714/763 |
| 2011/0041037 A1* | 2/2011 | Frost et al. ................... | 714/763 |

* cited by examiner

*Primary Examiner* — Yolanda L Wilson
(74) *Attorney, Agent, or Firm* — J.C. Patents

(57) ABSTRACT

A memory management method and a controller for a non-volatile memory storage device are provided. The memory management method and the controller are adapted for establishing a logical-to-physical mapping table of each block in a memory buffer of the controller by merely reading the data stored in a system management area within a start page of each block, so as to promote the management efficiency of the non-volatile memory storage device. In addition, the method and the controller of the present invention integrate all of or a part of the system management areas within the start page for efficiently managing and using the memory capacity of all the system management areas within the start page.

36 Claims, 8 Drawing Sheets

MEMORY MANAGEMENT METHOD AND CONTROLLER FOR NON-VOLATILE MEMORY STORAGE DEVICE

CROSS-REFERENCE TO RELATED APPLICATION

This application claims the priority benefit of Taiwan application serial no. 97111547, filed Mar. 28, 2008. The entirety of the above-mentioned patent application is hereby incorporated by reference herein and made a part of this specification.

BACKGROUND OF THE INVENTION

1. Field of the Invention

The present invention relates to a management technique of a storage medium, and particularly relates to a memory management method and a controller for a non-volatile memory storage device.

2. Description of Related Art

In recent years, consumers' demand for storage media has been surging as digital cameras, mobile phones with built-in digital cameras, MP3 players, and MP4 players are rapidly developed. Compared with other storage media, a flash memory has the characteristics of non-volatile data storage, low power consumption, small size, and non-mechanical structure, and is therefore an ideal built-in memory for the above portable multimedia storage devices. In addition, to satisfy the growing demands for detachable small-size memory cards and flash memory devices, manufacturers in this field all work on developing flash memories with larger capacity and higher use/management stability.

At present, a flash memory is generally collocated with a controller to form a flash memory storage device. It is known that the controller will sequentially read all the data stored in a sector of the start page of each block in the flash memory when the flash memory storage device is powered. Accordingly, the controller establishes the logical-to-physical mapping table of each block by a memory buffer (generally a SRAM) inside the controller. Thereby, the host which uses the flash memory storage device can receive the logical-to-physical mapping relationship of each block in the flash memory for accessing data from the flash memory storage device.

Generally speaking, a sector usually includes a user data area having a memory capacity of 512 bytes for storing user data; a system management area having a memory capacity of 6 bytes for storing system management data; and an error correction area having a memory capacity of 10 bytes for storing error correction codes (ECC). Herein, the content of the logical-to-physical mapping relationship of the blocks is usually stored in the system management area.

It can be known from the above that the controller needs to read all the data stored in a sector of the start page of each block in the flash memory so as to establish the logical-to-physical mapping table of each block in the memory buffer of the controller. However, as the memory capacity of a flash memory increases (i.e. the number of the blocks increases), this method reduces the management efficiency of the flash memory storage device (i.e. the speed of establishing the logical-to-physical mapping table becomes very slow).

Moreover, because of the advance of semiconductor technology, multi level cell (MLC) flash memories have been developed from single level cell (SLC) flash memories to increase memory capacity. However, the error correction code of the MLC flash memory requires a memory capacity up to 10 bytes or above. Consequently, the memory capacity of all the system management areas within the start page is reduced to less than 6 bytes, which is insufficient for each system management area.

SUMMARY OF THE INVENTION

Accordingly, the present invention is directed to a memory management method and a controller, which establish a logical-to-physical mapping table of each block by merely reading the data stored in a system management area, for promoting the management efficiency of a non-volatile memory storage device.

The present invention is further directed to a memory management method and a controller, which integrate a portion of the system management areas within the start page of each block to efficiently manage and use the memory capacity of all the system management areas within the start page, for promoting the management efficiency of a non-volatile memory storage device.

The present invention provides a memory management method for a non-volatile memory storage device. A general non-volatile memory storage device comprises a non-volatile memory and a controller. Herein, the non-volatile memory comprises a plurality of blocks. Each of the blocks comprises a plurality of pages, and each of the pages comprises a plurality of user data storage areas and a plurality of system management areas and error correction areas corresponding to the user data storage areas. The memory management method according to the present invention comprises the following steps of:

First, a memory capacity of at least a first system management area within a first page of all the pages of at least a first block of all the blocks in the non-volatile memory is divided into a system management data storage area and a system management data detection area corresponding to the system management data storage area. Herein, the system management data storage area is used for storing system management information (SMI); and the system management data detection area is used for storing a correction information.

Next, the controller is used to read and judge whether the data stored in the first system management area is correct or not. Finally, when the controller judges that the data stored in the first system management area is correct, a system information is established accordingly so as to make a host using the non-volatile memory storage device to obtain the logical-to-physical mapping relationship of the first block.

In an embodiment of the present invention, the memory management method further comprises the following step of:

When the controller judges that the data stored in the first system management area is incorrect, the controller reads the data stored in a first user data storage area and a first error correction area corresponding to the first system management area, and uses an error correction code (ECC) stored in the first error correction area to correct the data stored in the first system management area so as to establish the system information in a memory buffer of the controller accordingly.

In an embodiment of the present invention, the step of judging whether the data stored in the first system management area is correct or not comprises using the controller to detect whether the system management information is correct or not according to the correction information whenever the non-volatile memory storage device is powered. Wherein, the system management information records at least a logical-to-physical mapping relationship of the first block, the correction information comprises at least an error detection code, and the error detection code comprises a cyclic redundancy check code.

In another embodiment of the present invention, the memory capacity of the first system management area is further integrated with at least a portion of a memory capacity of at least a second system management area within the first page so that the memory capacity of the first system management area is larger than the memory capacities of other system management areas within the first page.

In another embodiment of the present invention, when the memory capacity of the first system management area is integrated with at least a portion of the memory capacity of the second system management area, the memory management method further comprises the following steps of:

An integrated memory capacity of the first and the second system management areas is divided into the system management data storage area and the system management data detection area corresponding to the system management data storage area, so that the controller would read and judge whether the data stored in the integrated memory capacity of the first and the second system management areas is correct or not. When the controller judges that the data stored in the integrated memory capacity of the first and the second system management areas is correct, the system information is established in a memory buffer of the controller accordingly.

In another embodiment of the present invention, when the memory capacity of the first system management area is integrated with at least a portion of or all of the memory capacity of the second system management area, the memory management method further comprises the following step of:

When the controller judges that the data stored in the integrated memory capacity of the first and the second system management areas is incorrect, the controller reads the data stored in a first user data storage area and a first error correction area corresponding to the first system management area, and uses the error correction code stored in the first error correction area to correct the data stored in the integrated memory capacity of the first and the second system management areas so as to establish the system information in the memory buffer of the controller accordingly.

In another embodiment of the present invention, the step of judging whether the data stored in the integrated memory capacity of the first and the second system management areas is correct or not comprises using the controller to detect whether the system management information is correct or not according to the correction information whenever the non-volatile memory storage device is powered. Wherein, the system management information records at least a logical-to-physical mapping relationship of the first block, the correction information comprises at least an error detection code, and the error detection code comprises a cyclic redundancy check code.

In yet another embodiment of the present invention, the memory capacity of the first system management area is further integrated with memory capacities of other system management areas within the first page so as to integrate the memory capacities of all the system management areas within the first page.

In yet another embodiment of the present invention, when the memory capacity of the first system management area is integrated with the memory capacities of other system management areas within the first page, the memory management method further comprises the following steps of:

An integrated memory capacity of all the system management areas within the first page is divided into the system management data storage area and a system management data error correction area corresponding to the system management data storage area, so that the controller would read and judge whether the data stored in the integrated memory capacity of all the system management areas within the first page is correct or not. When the controller judges that the data stored in the integrated memory capacity of all the system management areas within the first page is correct, the system information is established in the memory buffer of the controller accordingly.

In yet another embodiment of the present invention, when the memory capacity of the first system management area is integrated with the memory capacities of other system management areas within the first page, the memory management method further comprises the following step of:

When the controller judges that the data stored in the integrated memory capacity of all the system management areas within the first page is incorrect, the controller uses the error correction code stored in the system management data error correction area to correct the data stored in the integrated memory capacity of all the system management areas within the start page so as to establish the system information in the memory buffer of the controller accordingly.

In an embodiment of the present invention, the first page is a start page.

From another perspective, the present invention provides a controller adapted for a non-volatile memory storage device. The controller comprises a microprocessor unit, a non-volatile memory interface, a memory buffer, and a memory management module. Herein, the microprocessor unit is used for controlling the whole operation of the controller. The non-volatile memory interface is electrically connected with the microprocessor unit for accessing a non-volatile memory, wherein the non-volatile memory comprises a plurality of blocks, each of the blocks comprises a plurality of pages, and each of the pages comprises a plurality of user data storage areas and a plurality of system management areas and error correction areas corresponding to the user data storage areas.

The memory buffer is electrically connected with the microprocessor unit for temporarily storing data. The memory management module is electrically connected with the microprocessor unit for managing the non-volatile memory. Herein, the memory management module executes a memory management method for the non-volatile memory storage device, which comprises the following steps of:

First, a memory capacity of at least a first system management area within a first page of all the pages of at least a first block of all the blocks in the non-volatile memory is divided into a system management data storage area and a system management data detection area corresponding to the system management data storage area. Herein, the system management data storage area is used for storing system management information (SMI) and the system management data detection area is used for storing a correction information.

Next, the microprocessor unit is used to read and judge whether the data stored in the first system management area is correct or not through the non-volatile memory interface. Finally, a system information is established in the memory buffer when the microprocessor unit judges that the data stored in the first system management area is correct, so as to make a host using the non-volatile memory storage device to obtain the logical-to-physical mapping relationship of the first block.

In an embodiment of the present invention, the method further comprises the following step of when the microprocessor unit judges that the data stored in the first system management area is incorrect, the microprocessor unit reads the data stored in a first user data storage area and a first error correction area corresponding to the first system management area through the non-volatile memory interface, and uses an error correction code stored in the first error correction area to correct the data stored in the first system management area so as to establish the system information in the memory buffer accordingly.

In an embodiment of the present invention, the step of judging whether the data stored in the first system management area is correct or not comprises using the microprocessor unit to detect whether the system management information is correct or not according to the correction information whenever the non-volatile memory storage device is powered, wherein the system management information records at least a logical-to-physical mapping relationship of the first block, the correction information comprises at least an error detection code, and the error detection code comprises a cyclic redundancy check code.

In another embodiment of the present invention, the memory capacity of the first system management area is further integrated with at least a portion of or all of a memory capacity of a second system management area within the first page.

In another embodiment of the present invention, when the memory capacity of the first system management area is integrated with at least a portion of or all of the memory capacity of the second system management area, the memory management method further comprises the following steps of:

An integrated memory capacity of the first and the second system management areas is divided into the system management data storage area and the system management data detection area corresponding to the system management data storage area, so that the microprocessor unit is used to read and judge whether the data stored in the integrated memory capacity of the first and the second system management areas is correct or not through the non-volatile memory interface. When the microprocessor unit judges that the data stored in the integrated memory capacity of the first and the second system management areas is correct, the system information is established in the memory buffer by the microprocessor unit accordingly.

In another embodiment of the present invention, when the memory capacity of the first system management area is integrated with at least a portion of or all of the memory capacity of the second system management area, the memory management method further comprises the following step of:

When the microprocessor unit judges that the data stored in the integrated memory capacity of the first and the second system management areas is incorrect, the microprocessor unit reads the data stored in a first user data storage area and a first error correction area corresponding to the first system management area through the non-volatile memory interface, and uses the error correction code stored in the first error correction area to correct the data stored in the integrated memory capacity of the first and the second system management areas so as to establish the system information in the memory buffer accordingly.

In another embodiment of the present invention, the step of judging whether the data stored in the integrated memory capacity of the first and the second system management areas is correct or not comprises using the microprocessor unit to detect whether the system management information is correct or not according to the correction information whenever the non-volatile memory storage device is powered, wherein the system management information records at least a logical-to-physical mapping relationship of the first block the correction information comprises at least an error detection code, and the error detection code comprises a cyclic redundancy check code.

In yet another embodiment of the present invention, the memory capacity of the first system management area is further integrated with the memory capacities of other system management areas within the first page.

In yet another embodiment of the present invention, when the memory capacity of the first system management area is integrated with the memory capacities of other system management areas within the first page, the memory management method further comprises the following steps of:

An integrated memory capacity of all the system management areas within the start page is divided into the system management data storage area and a system management data error correction area corresponding to the system management data storage area, so that the microprocessor unit is used to read and judge whether the data stored in the integrated memory capacity of all the system management areas within the first page is correct or not through the non-volatile memory interface. When the microprocessor unit judges that the data stored in the integrated memory capacity of all the system management areas within the first page is correct, the system information is established in the memory buffer by the microprocessor unit accordingly.

In yet another embodiment of the present invention, when the memory capacity of the first system management area is further integrated with the memory capacities of other system management areas within the first page, the memory management method further comprises the following steps of:

When the microprocessor unit judges that the data stored in the integrated memory capacity of all the system management areas within the start page is incorrect, the microprocessor unit uses the error correction code stored in the system management data error correction area to correct the data stored in the integrated memory capacity of all the system management areas within the first page so as to establish the system information in the memory buffer accordingly.

In the above embodiments, the host may be a computer, a digital camera, a video camera, a communication apparatus, an audio player, a video player or any system capable of storing data. The non-volatile memory may be a SLC flash memory or a MLC flash memory.

The present invention further provides a data storage device having a program code stored therein. When a microprocessor unit executes the program code, the program code performs the memory management methods, as described in the above embodiments, on a non-volatile memory of a non-volatile memory storage device.

The present invention further provides a non-volatile memory storage device, which comprises a non-volatile memory and the controller according to the present invention.

The present invention provides a memory management method and a controller for a non-volatile memory storage device, which divide a system management area into two areas, one for storing system management data (such as the logical-to-physical mapping relationship of each block) and the other for storing an error detection code which detects the correctness of the system management data, when the system management area within the start page of each block has sufficient memory capacity. Thereby, when the non-volatile memory storage device is powered, the controller is able to establish the logical-to-physical mapping table of each block in the memory buffer of the controller by merely reading the data stored in the system management area within the start page of each block.

Further, when the memory capacity of the system management area within the start page of each block is insufficient, all of or a portion of the system management area within the start page of each block is integrated. An integrated memory capacity of the system management area is then divided into two areas, one for storing system management data (such as the logical-to-physical mapping relationship of each block) and the other for storing the error correction code (ECC) which corrects the system management data or for storing the error detection code (EDC) which detects the correctness of the system management data. Consequently, the controller only reads the data stored in the system management area within the start page of each block when the non-volatile memory storage device is powered.

Hence, the method and the controller according to the present invention not only promote the management efficiency of the non-volatile memory storage device but also help to efficiently manage and use the memory capacities of all the system management areas within the start page. Thereby, the problem that the memory capacity of each system management area within the start page becomes insufficient as the error correction code of the MLC flash memory requires more bytes can be solved.

In order to make the above and other objectives, features and advantages of the present invention more comprehensible, several preferable embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention aims at promoting the management efficiency of a non-volatile memory storage device and solving the problem that a memory capacity of each system management area within a start page becomes insufficient as an error correction code of a MLC flash memory requires more bytes. The technical features and technical effects of the present invention are described in detail as follows for reference.

Figure 1A:
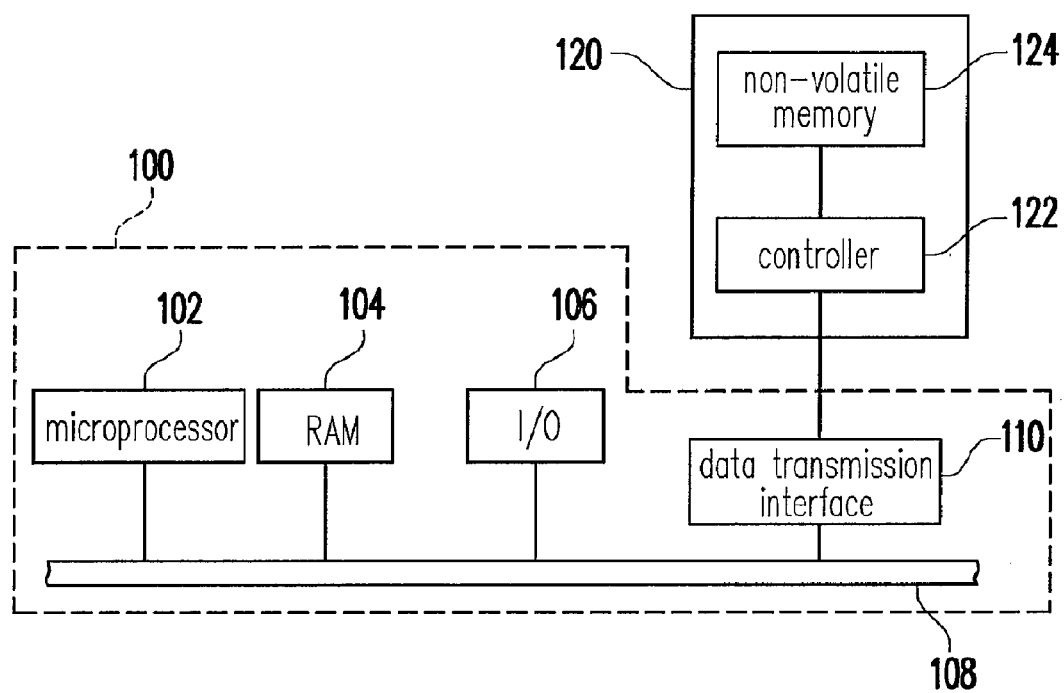
FIG. 1A is a block diagram illustrating a system of a host using a non-volatile memory storage device according to an embodiment of the present invention.

FIG. 1A is a block diagram illustrating a system of a host 100 using a non-volatile memory storage device 120 according to an embodiment of the present invention. Referring to FIG. 1A, the host 100 generally comprises a microprocessor 102, a random access memory (RAM) 104, an Input/Output (I/O) device 106, a system bus 108, and a data transmission interface 110. It is noted that the host 100 may further comprise other elements, such as a display device and a network device. In addition, the host 100 may be a computer, a digital camera, a video camera, a communication apparatus, an audio player, a video player, or any system in capable of storing data, for example.

In this embodiment, the non-volatile memory storage device 120 is electrically connected with the elements inside the host 100 through the data transmission interface 110. The host 100 may write data in the non-volatile memory storage device 120 or read data from the non-volatile memory storage device 120 through the microprocessor 102, the RAM 104, and the I/O device 106.

Figure 1B:
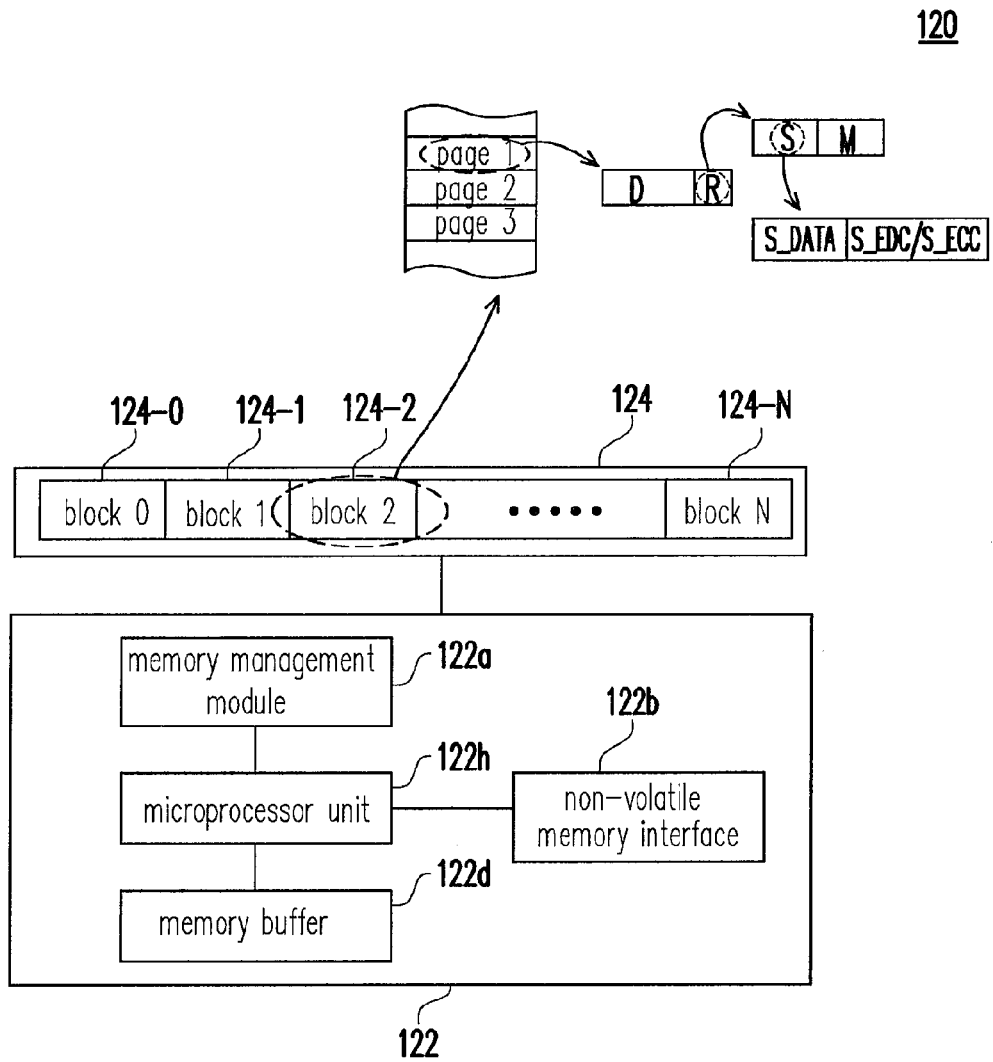
FIG. 1B is a block diagram illustrating a system of the non-volatile memory storage device in FIG. 1A.

FIG. 1B is a block diagram illustrating a system of the non-volatile memory storage device 120 in FIG. 1A. Referring to FIG. 1A and FIG. 1B, the non-volatile memory storage device 120 generally comprises a controller 122 and a non-volatile memory 124. Herein, the controller 122 is used for controlling the whole operation of the non-volatile memory storage device 120, such as storing data, reading data, and erasing data. The controller 122 comprises a memory management module 122a, a memory buffer 122d, a microprocessor unit 122h, and a non-volatile memory interface 122b.

The memory management module 122a is used for managing the non-volatile memory 124, such as executing a method for promoting the management efficiency of the non-volatile memory storage device according to the present invention, managing damaged blocks, and maintaining mapping table. The non-volatile memory interface 122b is used for accessing the non-volatile memory 124. In other words, the data written by the host 100 is transferred to a format acceptable to the non-volatile memory 124 through the non-volatile memory interface 122b.

The memory buffer 122d is used for temporarily storing system data (such as mapping table) or the data to be read or written by the host 100. In this embodiment, the memory buffer 122d is a static random access memory (SRAM). However, it is noted that the present invention is not limited thereto. In other words, a dynamic random access memory (DRAM), a magnetic random access memory (MRAM), a phase-change random access memory (PRAM), or other suitable memories may also be applied in the present invention.

The microprocessor unit 122h is used for controlling the whole operation of the controller 122, and the non-volatile memory 124 is used for storing data. In this embodiment, the non-volatile memory 124 is a flash memory. To be more specific, the non-volatile memory 124 is a MLC flash memory. However, the present invention is not limited thereto. The non-volatile memory 124 may also be a SLC flash memory.

Figure 1C:
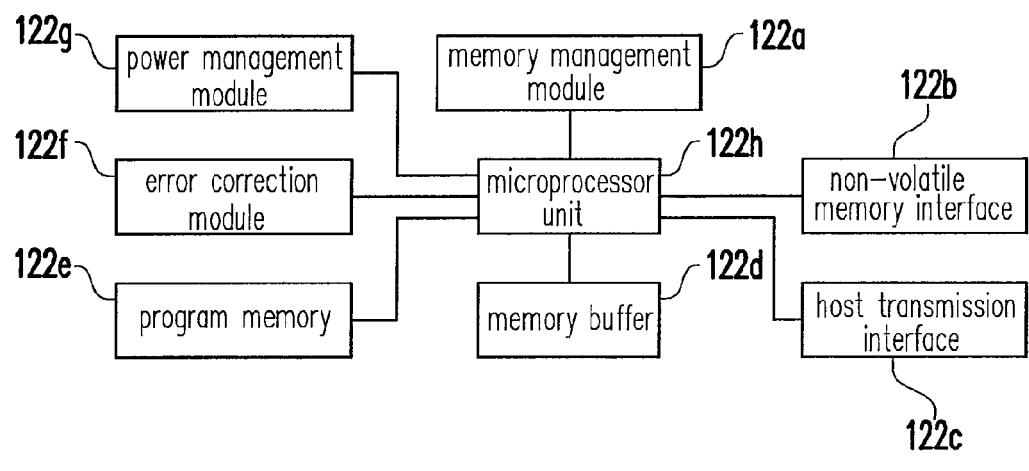
FIG. 1C is a block diagram further illustrating the system of the non-volatile memory storage device in FIG. 1A.

In this embodiment, the controller 122 further comprises a host transmission interface 122c, a program memory 122e, an error correction module 122f, and a power management module 122g (as shown in FIG. 1C). Herein, the host transmission interface 122c is used for communicating with the host 100. The host transmission interface 122c may be a USB interface, an IEEE 1394 interface, a SATA interface, a PCI Express interface, a MS interface, a MMC interface, a SD interface, a CF interface, or an IDE interface.

The program memory 122e is used for storing a program code which the controller 122 executes to control the non-volatile memory storage device 120. The error correction module 122f is used for calculating an error correction code (ECC) for checking and correcting the data read or written by the host 100. The power management module 122g is used for managing a power of the non-volatile memory storage device 120.

Referring to FIG. 1A~FIG. 1C, the non-volatile memory 124 is usually substantially divided into a plurality of physical blocks 124-0~124-N. Generally speaking, a block is a minimum unit for erasing in the flash memory, and each block comprises a minimum number of memory cells for being erased together. Generally each block is divided into a plurality of pages, wherein a page is usually a minimum unit for program/read. However, it is noted that a sector may be the minimum unit for program/read in other flash memory designs. In other words, a page comprises a plurality of sectors, and a sector is used as the minimum unit for program/read.

It is to say that a page is the minimum unit for writing or reading data. Each page usually comprises a user data storage area D and a redundancy area R, and the redundancy area R usually comprises a system management area S and an error correction area M. Herein, the user data storage area D is used for storing user data; the system management area S is used for storing system management data (such as the logical-to-physical mapping table of each block, the start page of a block, and so forth); and the error correction area M is used for storing a parity of an ECC calculated by the error correction module 122f.

Generally speaking, to correspond to the size of a sector of a disk driver, the user data storage area D is usually 512 bytes and the redundancy area R is usually 16 bytes, wherein the system management area S is 6 bytes and the error correction area M is 10 bytes. In other words, a page may be formed by a sector or a plurality of sectors. For example, a page may comprise four sectors, wherein D is 2048 bytes and R is 64 bytes, or comprise more capacity and more sectors. In addition, a block may comprise a various number of pages, such as 64 pages, 128 pages, 256 pages and so forth.

Furthermore, in order to manage the non-volatile memory storage device 120 more efficiently, generally the blocks 124-0~124-N of the non-volatile memory storage device 120 are logically divided into a system group, a data group, and a backup group. Generally speaking, above 90% of the blocks 124-0~124-N of the non-volatile memory storage device 120 are divided into the data group, and the rest blocks are divided into the system group and the backup group.

The blocks in the system group are mainly used for recording system data, such as the number of the areas of the non-volatile memory 124, the number of the blocks in each area, the number of the pages in each block, and so forth. The blocks in the data group are mainly used for storing user data. The blocks in the backup group are mainly used for replacing the blocks in the data group. Hence, the blocks in the backup group are usable blocks, i.e. blocks which record no data or record the data marked as invalid.

Accordingly, to promote the management efficiency of the non-volatile memory storage device 120 and to solve the problem that the memory capacity of each system management area S within the start page becomes insufficient as the error correction code of the MLC flash memory requires more bytes, a method for promoting management efficiency according to the present invention is described in detail as follows for reference.

Figure 2:
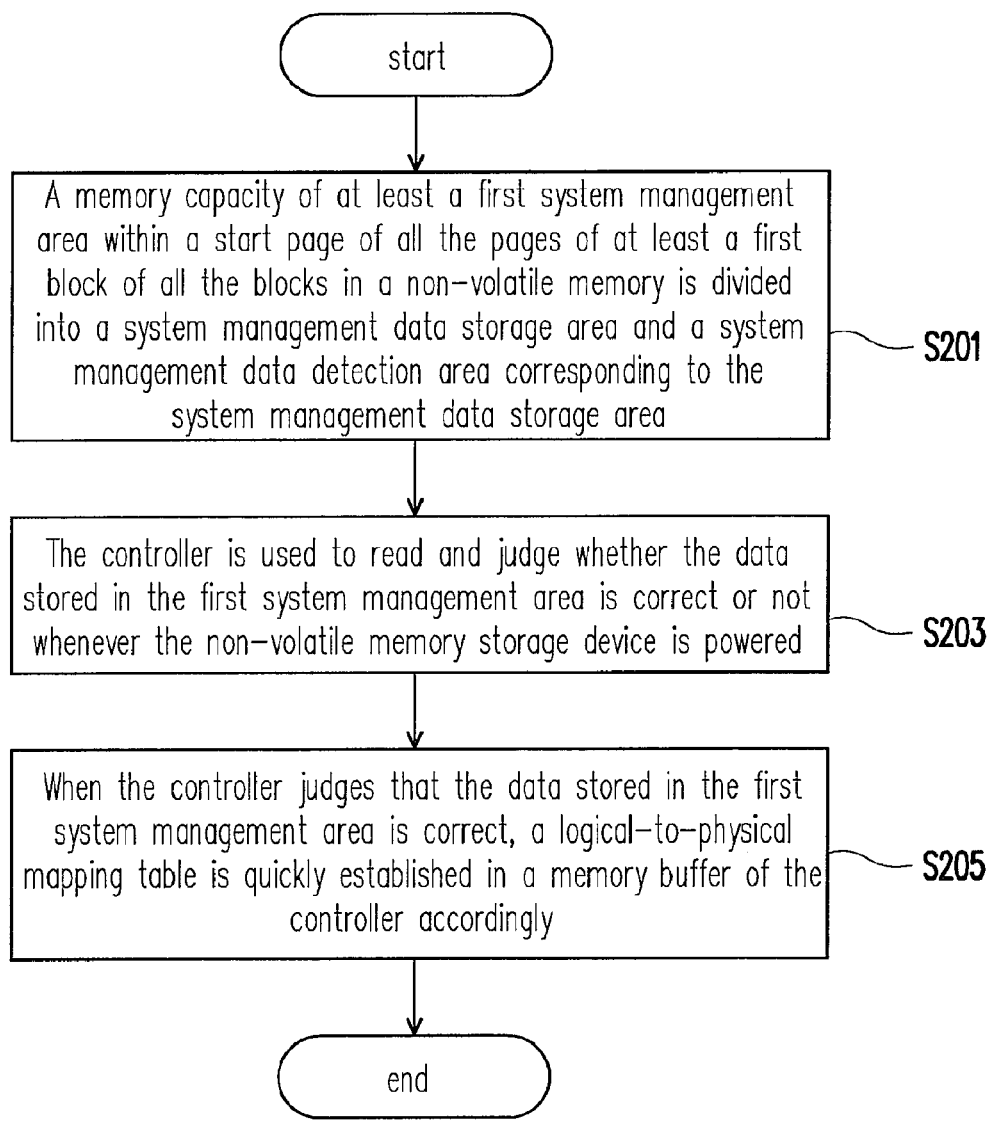
FIG. 2 is a process flow illustrating a method for promoting management efficiency of a non-volatile memory storage device according to an embodiment of the present invention.

FIG. 2 is a process flow illustrating a method for promoting the management efficiency of the non-volatile memory storage device according to an embodiment of the present invention. Referring to FIG. 1A~FIG. 1C and FIG. 2, when a system management area S within the start page of each of the blocks 124-0~124-N has sufficient memory capacity, the method for promoting the management efficiency of the non-volatile memory storage device 120 according to this embodiment comprises the following steps of: First, as described in Step S201, a memory capacity of at least a first system management area S within a start page of all the pages of at least a first block of all the blocks 124-0~124-N in the non-volatile memory 124 is divided into a system management data storage area S_DATA and a system management data detection area S_EDC corresponding to the system management data storage area S_DATA. Herein, the system management data storage area S_DATA is used for storing system management information, which at least records a logical-to-physical mapping relationship of the first block; and the system management data detection area S_EDC is used for storing an error detection code (EDC).

Next, as described in Step S203, the controller 122 is used to read and judge whether the data stored in the first system management area S_DATA is correct or not whenever the non-volatile memory storage device 120 is powered. Finally, as described in Step S205, when the controller 122 judges that the data stored in the first system management area S_DATA is correct, the logical-to-physical mapping table is established in the memory buffer 122d of the controller accordingly, so as to make the host 100 which uses the non-volatile memory storage device 120 to obtain the logical-to-physical mapping relationship of the first block. Thereby, the host 100 may access the data from each of the blocks 124-0~124-N of the non-volatile memory 124.

The logical-to-physical mapping table established in the memory buffer 122d is lost whenever the power supply to the non-volatile memory storage device 120 is disconnected. Hence, unlike the conventional technique in which the controller 122 establishes the logical-to-physical mapping table in the memory buffer 122d after sequentially reading all the data stored in one sector within the start page of each of the blocks 124-0~124-N in the non-volatile memory 124; on the contrary, the controller 122 in this embodiment only sequentially reads the data stored in one certain system management area S within the start page of each of the blocks 124-0~124-N whenever the non-volatile memory storage device 120 is powered.

And thereby, the controller 122 establishes the logical-to-physical mapping table in the memory buffer 122d. Consequently, the controller 122 in this embodiment establishes the logical-to-physical mapping table faster than the controller of the conventional non-volatile memory storage device. The whole management efficiency of the non-volatile memory storage device 120 therefore is enhanced.

It is noted that the controller 122 judges whether the data (i.e. system management data, such as the logical-to-physical mapping relationship of each block) stored in the system management data storage area S_DATA is correct or not according to the error detection code (EDC) stored in the system management data detection area S-EDC of the certain system management area S within the start page of each of the blocks 124-0~124-N.

Based on the above, it is known that the memory capacity of the system management area S is 6 bytes, and generally the memory capacity of the system management data storage area S_DATA is 4 bytes and the memory capacity of the system management data detection area S_EDC is 2 bytes, but the present invention is not limited thereto. Consequently, the error detection code (EDC) stored in the system management data detection area S_EDC may use CRC-16 to detect whether the data stored in the system management data storage area S_DATA is corrector not, but the present invention is not limited thereto. The number of the bits of CRC is determined according to the bytes of the system management data storage area S_DATA. For instance, CRC-32 is used to detect if the data stored in the system management data storage area S_DATA is correct when S-DATA is 4 bytes.

Hence, when the controller 122 judges that the data stored in the system management data storage area S_DATA of the system management area S within the start page of each of the blocks 124-0~124-N is correct, the logical-to-physical mapping table is established in the memory buffer 122*d* accordingly. However, when the controller 122 judges that the data stored in the system management data storage area S_DATA of the system management area S within the start page of a block (one of the blocks 124-0~124-N) is incorrect, the controller 122 simultaneously reads the data stored in the user data storage area D and the error correction area M corresponding to the system management data storage area S_DATA, and uses the ECC stored in the error correction area M to correct the data stored in the system management data storage area S_DATA. After the data is corrected, the logical-to-physical mapping table is established in the memory buffer 122*d* of the controller 122 accordingly.

Because each system management data storage area S_DATA has its corresponding system management data detection area S_EDC, the controller 122 is able to quickly judge the correctness of the data stored in the system management data storage area S_DATA of the system management area S when accessing the system management area S. After the aforesaid processes of judging the correctness of the data stored in the system management data storage area S_DATA, the controller 122 thereby establishes the logical-to-physical mapping table in the memory buffer 122*d* accordingly to enhance the management efficiency of the non-volatile memory storage device 120.

However, the spirit of the present invention is not limited to the above embodiment. Other embodiments of the present invention are described in detail as follows for reference.

Figure 3:
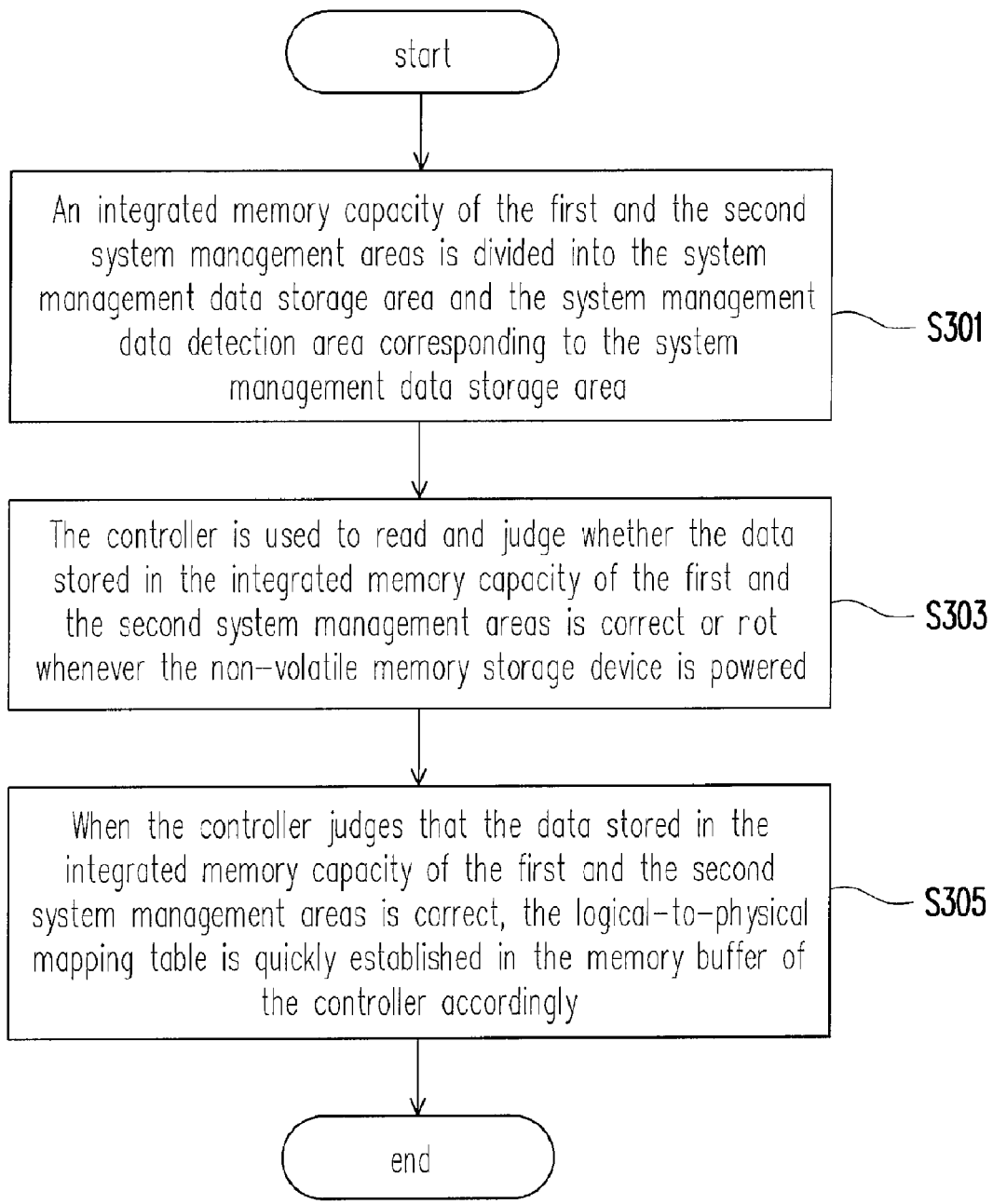
FIG. 3 is a process flow illustrating a method for promoting management efficiency of a non-volatile memory storage device according to another embodiment of the present invention.

FIG. 3 is a process flow illustrating a method for promoting the management efficiency of a non-volatile memory storage device according to another embodiment of the present invention. Referring to FIG. 1A~FIG. 1C and FIG. 3, because the number of the bytes required by the error correction code of the MLC flash memory is increased, the memory capacity of each system management area S within the start page needs to be reduced accordingly. Therefore, in this embodiment, when the memory capacity of the system management area S within the start page of each of the blocks 124-0~124-N is insufficient, the memory capacity of the first system management area, as described in the above embodiment, is further integrated with at least a portion of or all of a memory capacity of at least a second system management area within the start page so that the memory capacity of the first system management area is larger than the memory capacities of other system management areas within the start page.

According to this embodiment, a method for promoting the management efficiency of the non-volatile memory storage device 120 comprises the following steps of. First, as described in Step S301, an integrated memory capacity of the first and the second system management areas is divided into the system management data storage area S_DATA and the system management data detection area S_EDC corresponding to the system management data storage area S_DATA, as described in the above embodiment. Next, as described in Step S303, the controller 122 is used to read and judge whether the data stored in the integrated memory capacity of the first and the second system management areas is correct or not whenever the non-volatile memory storage device 120 is powered. Finally, as described in Step S305, when the controller 122 judges that the data stored in the integrated memory capacity of the first and the second system management areas is correct, the logical-to-physical mapping table is established in the memory buffer 122*d* of the controller 122 accordingly.

To explain the spirit of this embodiment more clearly, a start page having a memory capacity of 2K bytes is taken as an example in the following paragraphs for reference, but the present invention is not limited thereto.

Figure 4:
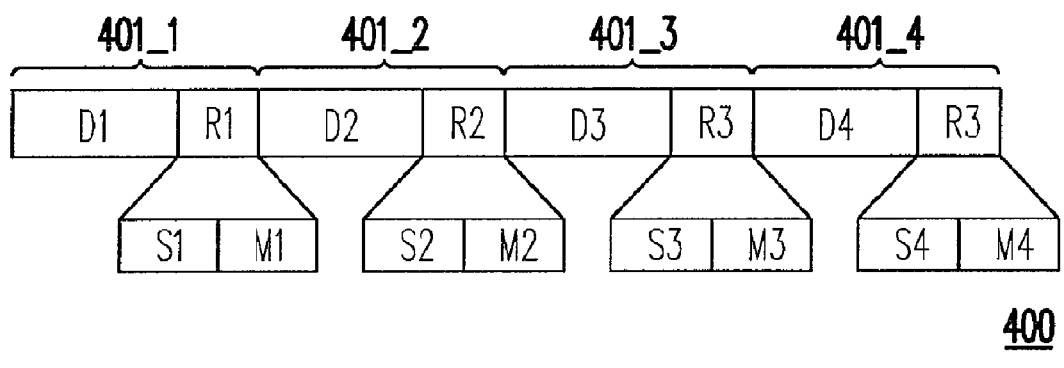
FIG. 4 is a diagram illustrating a distribution of a start page.

FIG. 4 is a diagram illustrating a distribution of a start page 400. Referring to FIG. 1~FIG. 4, the memory capacity of the start page 400 in FIG. 4 is 2K bytes. The start page 400 mainly comprises four sectors 401_1~401_4 (each sector is 512 bytes), and the sectors 401_1~401_4 respectively have user data storage areas D1/D2/D3/D4 and corresponding redundancy areas R1/R2/R3/R4, wherein the redundancy areas R1/R2/R3/R4 respectively comprise system management areas S1/S2/S3/S4 and error correction areas M1/M2/M3/M4.

In this embodiment, if the memory capacity of the system management area S1 within the start page 400 is insufficient (i.e. 6 bytes), the memory capacity of the system management area S1 is integrated with at least a portion of or all of a memory capacity of the second system management area S2 so that the memory capacity of the system management area S1 is larger than the memory capacities of the system management areas S2, S3, and S4. Thereby, the problem of insufficient memory capacity is solved.

Based on the above, after the integrated memory capacity (maximum 12 bytes) of the first and the second system management areas S1 and S2 is divided into the system management data storage area S_DATA and the system management data detection area S_EDC corresponding to the system management data storage area S_DATA, as described in the above embodiment, the controller 122 is used to read and judge whether the data stored in the integrated memory of the first and the second system management areas S1 and S2 is correct or not whenever the non-volatile memory storage device 120 is powered. When the controller 122 judges that the data stored in the integrated memory capacity of the first and the second system management areas S1 and S2 is correct, the logical-to-physical mapping table is established in the memory buffer 122*d* of the controller 122 accordingly.

In this embodiment, when the memory capacity of one system management area S within the start page of each of the blocks 124-0~124-N is insufficient, a portion of or all of the system management areas are integrated together. Take the page having 2K bytes and four sectors as an example, at least the memory capacities of the system management areas S1 and S2 in the sectors 401_1 and 401_2 may be integrated to enlarge the memory capacity for storing the system management information. This method integrates the memory capacity of the system management area in one sector within the start page of each of the blocks 124-0~124-N with a portion of or all of the memory capacities of the system management areas in other sectors within the start page, or integrates all the memory capacity of one system management area within the start page of each of the blocks 124-0~124-N with all the memory capacities of at least a portion of or all of the system management areas within the start page.

In either of the integrating methods, the integrated memory capacity of the system management areas within the start page of each of the blocks 124-0~124-N is still divided into the system management data storage area S_DATA and the system management data detection area S_EDC corresponding to the system management data storage area S_DATA, as described in the aforesaid embodiment. Therefore, each system management data storage area S_DATA still has one corresponding system management data detection area S_EDC.

Consequently, when accessing the data stored in the integrated system management areas, the controller 122 is able to quickly judge the correctness of the data stored in the system management data storage area S_DATA, and correspondingly performs the aforementioned processes to establish the logical-to-physical mapping table in the memory buffer 122d. The whole management efficiency of the non-volatile memory storage device 120 is thereby promoted.

In the above two embodiments, the EDC (i.e. CRC) stored in the system management data detection area S_EDC is used to detect the correctness of the data stored in the system management data storage area S_DATA corresponding to the system management data detection area S_EDC. Herein, when the controller 122 judges that the data stored in the system management data storage area S_DATA corresponding to the system management data detection area S_EDC is correct, the controller 122 is able to accurately records the logical-to-physical mapping relationship of each of the blocks 124-0~124-N in the memory buffer 122d accordingly.

However, when the controller 122 judges that the data is incorrect, the controller 122 simultaneously reads the data stored in the user data storage area D and the error correction area M corresponding to the system management data storage area S_DATA, and uses the ECC stored in the error correction area M to correct the data stored in the system management data storage area S_DATA so as to establish the logical-to-physical mapping table in the memory buffer 122d of the controller 122 accordingly.

Figure 5:
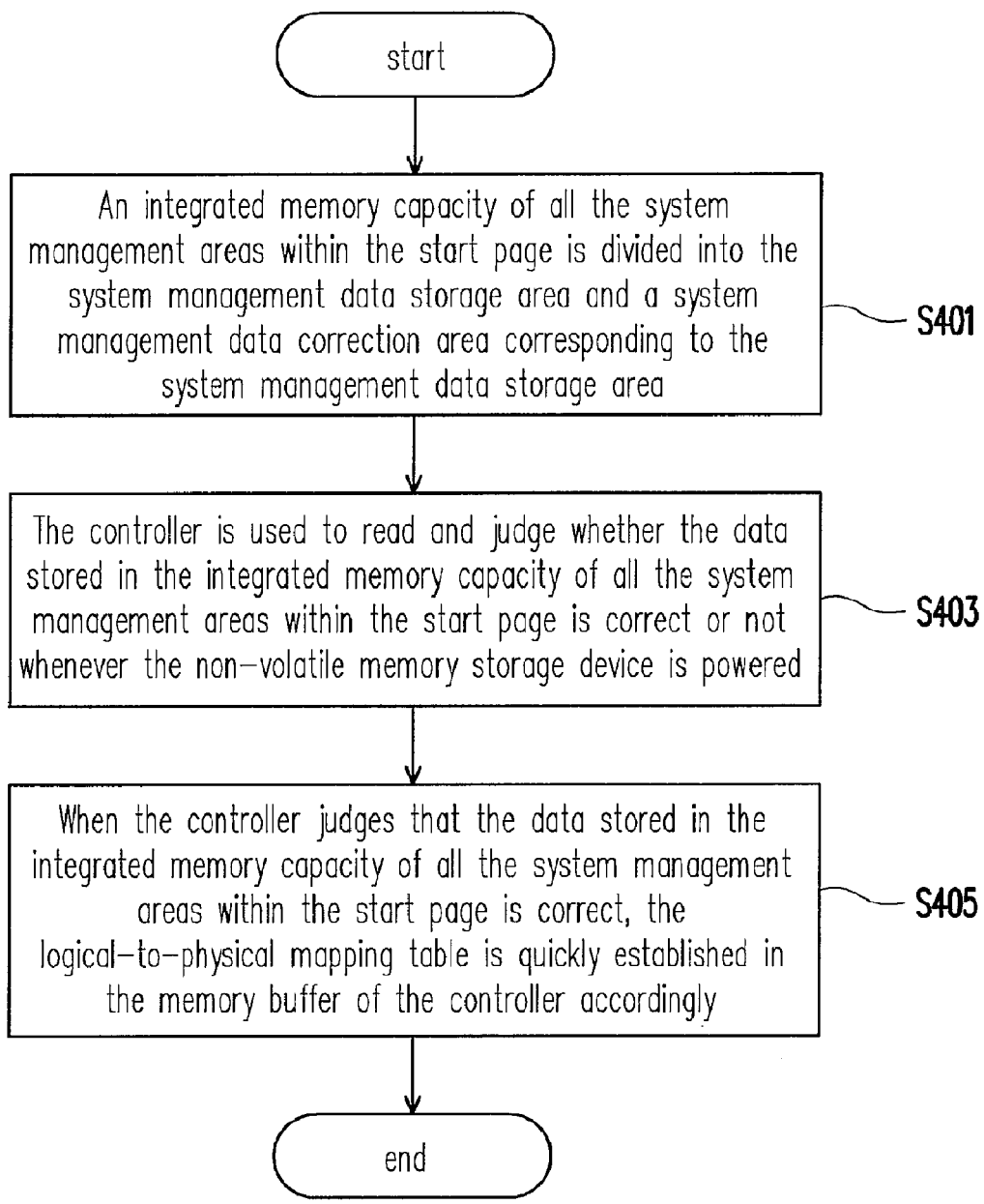
FIG. 5 is a process flow illustrating a method for promoting management efficiency of a non-volatile memory storage device according to another embodiment of the present invention.

However, the spirit of the present invention is not limited to the above embodiment. FIG. 5 is a process flow illustrating a method for promoting the management efficiency of a non-volatile memory storage device according to another embodiment of the present invention. Referring to FIG. 1A~FIG. 1C and FIG. 4~FIG. 5, because the number of the bytes required by the error correction code of the MLC flash memory is increased, the memory capacity of each system management area S within the start page needs to be reduced accordingly. Therefore, in this embodiment, when the memory capacity of the system management area S within the start page of each of the blocks 124-0~124-N is insufficient, the memory capacity of the first system management area, as described in the above embodiment, is further integrated with all the memory capacities of other system management areas within the start page (take the start page 400 in FIG. 4 as an example, all the memory capacities of the system management areas S1~S4 within the start page 400 are integrated together).

In this embodiment, the method for promoting the management efficiency of the non-volatile memory storage device 120 comprises the following steps of: First, as described in Step S401, an integrated memory capacity of the system management areas S1~S4 within the start page 400 is divided into the system management data storage area S_DATA, as described in the aforesaid embodiment, and a system management data correction area S_ECC corresponding to the system management data storage area S_DATA. Next, as described in Step S403, the controller 122 is used to read and judge whether the data stored in the integrated memory capacity of the system management areas S1~S4 within the start page 400 is correct or not whenever the non-volatile memory storage device 120 is powered. Finally, as described in Step S405, when the controller 122 judges that the data stored in the integrated memory capacity of the system management areas S1~S4 within the start page 400 is correct, the logical-to-physical mapping table is established in the memory buffer 122d of the controller 122 accordingly.

In this embodiment, the memory capacities of all the system management areas within the start page of each of the blocks 124-0~124-N are integrated together and divided into the system management data storage area S_DATA, as described in the aforesaid embodiment, and a system management data correction area S_ECC corresponding to the system management data storage area S_DATA. Thereby, the controller 122 may quickly judge the correctness of the data stored in the system management data storage area S_DATA when accessing the data from the integrated system management areas.

In addition, this embodiment is similar to the above embodiments that, when the controller 122 judges that the data stored in the integrated memory capacity of all the system management areas within the start page is correct (i.e. using the error correction code stored in the system management data correction area to detect whether the data stored in the system management data storage area S_DATA of the integrated system management areas is correct or not), the controller 122 establishes the logical-to-physical mapping table the memory buffer 122d accordingly.

The difference between this embodiment and the above embodiments lies in that, when the controller 122 judges that the data stored in the integrated memory capacity of all the system management areas within the start page is incorrect, the controller 122 directly corrects the data according to the error correction code (another ECC) stored in the system management data correction area S_ECC, so as to establish the logical-to-physical mapping table in the memory buffer 122d of the controller 122 accordingly.

It is known from the above that, in this embodiment, the data stored in the system management data storage area S_DATA of the integrated system management areas may be corrected to establish the logical-to-physical mapping table in the memory buffer 122d without using the ECC stored in the error correction area M. As a consequence, the management efficiency of the non-volatile memory storage device 120 is enhanced.

Therefore, the memory management module 122a in the controller 122 may execute any of the methods disclosed in the above embodiments for promoting the management efficiency of the non-volatile memory storage device 120 and solving the problem that the memory capacities of the system management areas S within the start page become insufficient as the number of the bytes required by the error correction code of the MLC flash memory is increased.

Hence, any concepts, which include integrating or dividing the memory capacity of the system management area within any page of the blocks to make the memory capacity of one system management area different from the memory capacities of other system management areas in one sector, all belong to the protection range of the present invention.

Based on the spirit of the present invention, the present invention further provides a data storage device which has a program code stored therein. When executed by a microprocessor, the program code performs any of the methods, as described in the above embodiments, on the non-volatile memory and promotes the management efficiency of the non-volatile memory storage device. Such a device also belongs to the protection range of the present invention.

Figure 6:
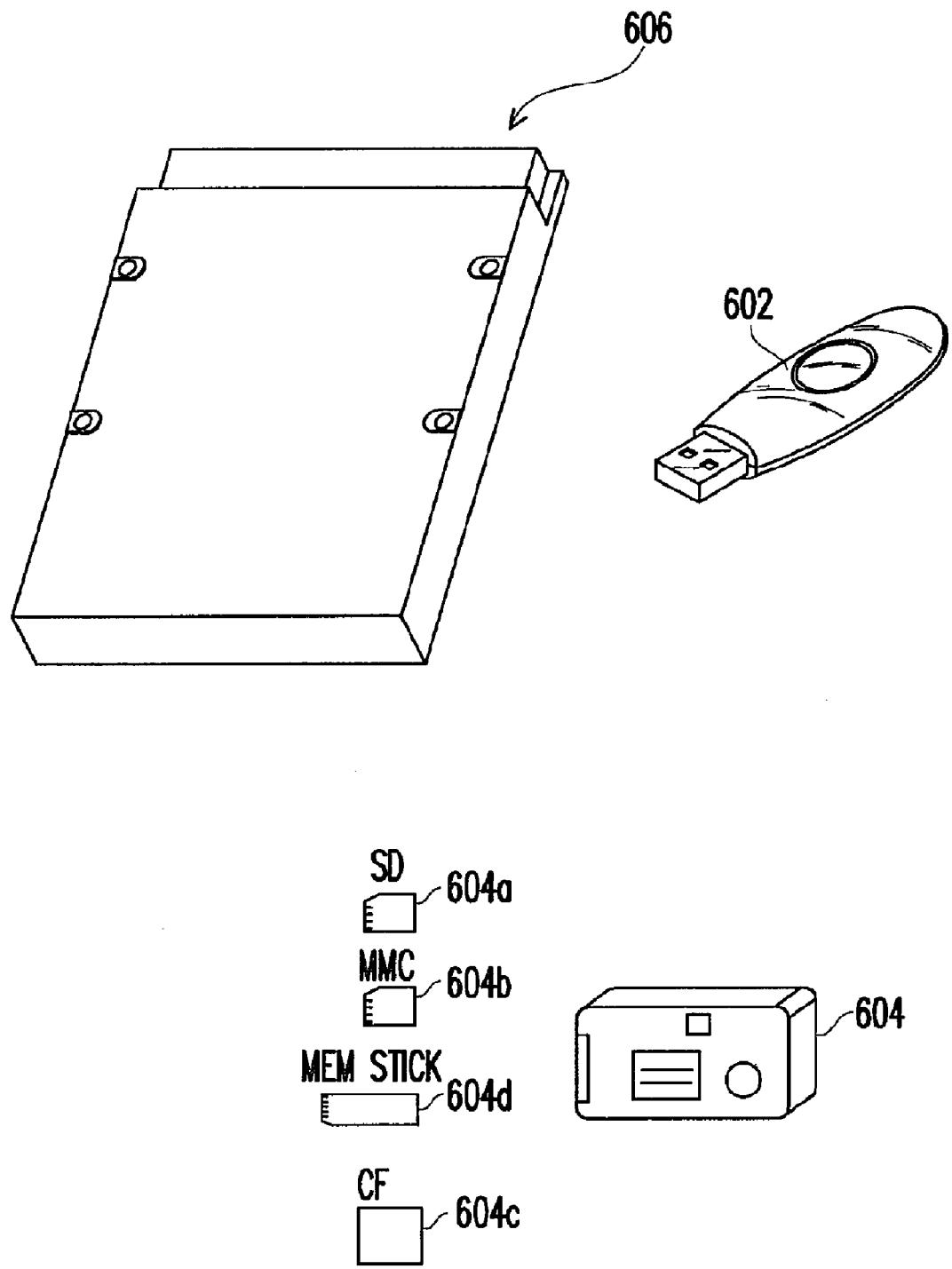
FIG. 6 illustrates various devices to which a method for promoting management efficiency of a non-volatile memory storage device according to the present invention is applied.

Moreover, the methods for promoting management efficiency according to the present invention are adapted for various non-volatile memory storage devices, such as USB flash disk 602, SD card 604a, MMC card 604b, CF card 604c, and memory stick 604d used in a digital camera (video camera) 604, and solid hard drive 606, as illustrated in FIG. 6.

To conclude, the present invention provides the method and the controller for promoting the management efficiency of the non-volatile memory storage device. The method is to divide the system management area into two areas, one for storing system management data (such as the logical-to-physical mapping relationship of each block) and the other for storing the error detection code which detects the correctness of the system management data, when the system management area within the start page of each block has sufficient memory capacity. Consequently, when the non-volatile memory storage device is powered, the controller is able to establish the logical-to-physical mapping table of each block in the memory buffer of the controller by merely reading the data stored in the system management area within the start page of each block.

Further, when the memory capacity of the system management area within the start page of each block is insufficient, all of or a portion of the system management areas are integrated together, and the integrated memory capacity of the system management areas is then divided into two areas, one for storing system management data (such as the logical-to-physical mapping relationship of each block) and the other for storing the error correction code which corrects the system management data or storing the error detection code which detects the correctness of the system management data. Hence, when the non-volatile memory storage device is powered, the controller only reads the data stored in the system management area within the start page of each block.

Therefore, the method and the controller according to the present invention not only promote the management efficiency of the non-volatile memory storage device but also help to manage and use the memory capacities of all the system management areas within the start page more efficiently. Consequently, the problem that the memory capacity of each system management area becomes insufficient as the number of the bytes required by the error correction code of the MLC flash memory is increased can be solved.

Although the present invention has been disclosed by the above embodiments, they are not intended to limit the present invention. Persons skilled in the art may make some modifications and alterations without departing from the spirit and scope of the present invention. Therefore, the protection range of the present invention falls in the appended claims.

What is claimed is:

1. A memory management method for a non-volatile memory storage device comprising a non-volatile memory and a controller, the non-volatile memory comprising a plurality of blocks, each of the blocks comprising a plurality of pages, and each of the pages comprising a plurality of user data storage areas and a plurality of system management areas and error correction areas corresponding to the user data storage areas, the method comprising:

dividing a memory capacity of at least a first system management area within a first page of the pages of at least a first block of the blocks into a system management data storage area and a system management data detection area corresponding to the system management data storage area, wherein the system management data storage area is used for storing a system management information, and the system management data detection area is used for storing a correction information;

using the controller to read and judge whether the data stored in the first system management area is correct or not; and establishing a system information when the controller judges that the data stored in the first system management area is correct.

2. The memory management method as claimed in claim 1, further comprising:

when the controller judges that the data stored in the first system management area is incorrect, the controller reads the data stored in a first user data storage area and a first error correction area corresponding to the first system management area, and uses an error correction code stored in the first error correction area to correct the data stored in the first system management area so as to establish the system information in a memory buffer of the controller accordingly.

3. The memory management method as claimed in claim 2, wherein the step of judging whether the data stored in the first system management area is correct or not comprises:

using the controller to detect whether the system management information is correct or not according to the correction information whenever the non-volatile memory storage device is powered, wherein the system management information records at least a logical-to-physical mapping relationship of the first block, the correction information comprises at least an error detection code, and the error detection code comprises a cyclic redundancy check code.

4. The memory management method as claimed in claim 1, wherein the memory capacity of the first system management area is further integrated with at least a portion of a memory capacity of at least a second system management area within the first page so that the memory capacity of the first system management area is larger than the memory capacities of other system management areas within the first page.

5. The memory management method as claimed in claim 4, further comprising:

dividing an integrated memory capacity of the first and the second system management areas into the system management data storage area and the system management data detection area corresponding to the system management data storage area.

6. The memory management method as claimed in claim 5, wherein the controller would read and judge whether the data stored in the integrated memory capacity of the first and the second system management areas is correct or not, wherein when the controller judges that the data stored in the integrated memory capacity of the first and the second system management areas is correct, the controller would establish the system information in a memory buffer of the controller.

7. The memory management method as claimed in claim 6, wherein when the controller judges that the data stored in the integrated memory capacity of the first and the second system management areas is incorrect, the controller reads the data stored in a first user data storage area and a first error correction area corresponding to the first system management area, and uses an error correction code stored in the first error correction area to correct the data stored in the integrated memory capacity of the first and the second system management areas so as to establish the system information in a memory buffer of the controller accordingly.

8. The memory management method as claimed in claim 6, wherein the step of judging whether the data stored in the integrated memory capacity of the first and the second system management areas is correct or not comprises:

using the controller to detect whether the system management information is correct or not according to the correction information whenever the non-volatile memory storage device is powered, wherein the system management information records at least a logical-to-physical mapping relationship of the first block, the correction information comprises at least an error detection code, and the error detection code comprises a cyclic redundancy check code.

9. The memory management method as claimed in claim 1, wherein the memory capacity of the first system management area is further integrated with memory capacities of other system management areas within the first page so as to integrate the memory capacities of all the system management areas within the first page.

10. The memory management method as claimed in claim 9, further comprising:
dividing an integrated memory capacity of all the system management areas within the first page into the system management data storage area and a system management data error correction area corresponding to the system management data storage area.

11. The memory management method as claimed in claim 10, wherein the controller would read and judge whether the data stored in the integrated memory capacity of all the system management areas within the first page is correct or not,
wherein when the controller judges that the data stored in the integrated memory capacity of all the system management areas within the first page is correct, the controller would establish the system information in a memory buffer of the controller.

12. The memory management method as claimed in claim 11, wherein when the controller judges that the data stored in the integrated memory capacity of all the system management areas within the first page is incorrect, the controller uses an error correction code stored in the system management data error correction area to correct the data stored in the integrated memory capacity of all the system management areas within the first page so as to establish the system information in the memory buffer of the controller accordingly.

13. The memory management method as claimed in claim 12, wherein the step of judging whether the data stored in the integrated memory capacity of all the system management areas within the first page is correct or not comprises:
using the controller to detect whether the system management information is correct or not according to the correction information whenever the non-volatile memory storage device is powered,
wherein the system management information records at least a logical-to-physical mapping relationship of the first block, the correction information comprises at least an error detection code, and the error detection code comprises a cyclic redundancy check code.

14. The memory management method as claimed in claim 1, wherein the first page is a start page.

15. A controller adapted for a non-volatile memory storage device, comprising:
a microprocessor unit used for controlling a whole operation of the controller;
a non-volatile memory interface electrically connected with the microprocessor unit for accessing a non-volatile memory in the non-volatile memory storage device, wherein the non-volatile memory comprises a plurality of blocks, each of the blocks comprises a plurality of pages, and each of the pages comprises a plurality of user data storage areas and a plurality of system management areas and error correction areas corresponding to the user data storage areas;
a memory buffer electrically connected with the microprocessor unit for temporarily storing data; and
a memory management module electrically connected with the microprocessor unit for managing the non-volatile memory, wherein the memory management module executes a memory management method for the non-volatile memory storage device, the memory management method comprising:
dividing a memory capacity of at least a first system management area within a first page of the pages of at least a first block of the blocks into a system management data storage area and a system management data detection area corresponding to the system management data storage area, wherein the system management data storage area is used for storing a system management information, and the system management data detection area is used for storing a correction information;
using the microprocessor unit to read and judge whether the data stored in the first system management area is correct or not through the non-volatile memory interface; and
establishing a system information when the microprocessor unit judges that the data stored in the first system management area is correct.

16. The controller as claimed in claim 15, wherein the memory management method further comprises:
when the microprocessor unit judges that the data stored in the first system management area is incorrect, the microprocessor unit reads the data stored in a first user data storage area and a first error correction area corresponding to the first system management area through the non-volatile memory interface, and uses an error correction code stored in the first error correction area to correct the data stored in the first system management area so as to establish the system information in the memory buffer accordingly.

17. The controller as claimed in claim 16, wherein the step of judging whether the data stored in the first system management area is correct or not comprises:
using the microprocessor unit to detect whether the system management information is correct or not according to the correction information whenever the non-volatile memory storage device is powered,
wherein the system management information records at least a logical-to-physical mapping relationship of the first block, the correction information comprises at least an error detection code, and the error detection code comprises a cyclic redundancy check code.

18. The controller as claimed in claim 15, wherein the memory capacity of the first system management area is further integrated with at least a portion of a memory capacity of at least a second system management area within the first page so that the memory capacity of the first system management area is larger than the memory capacities of other system management areas within the first page.

19. The controller as claimed in claim 18, wherein the memory management method further comprises:
dividing an integrated memory capacity of the first and the second system management areas into the system management data storage area and the system management data detection area corresponding to the system management data storage area.

20. The controller as claimed in claim 19, wherein the microprocessor unit would read and judge whether the data stored in the integrated memory capacity of the first and the second system management areas is correct or not through the non-volatile memory interface, wherein when the microprocessor unit judges that the data stored in the integrated memory capacity of the first and the second system management areas is correct, the microprocessor unit would establish the system information in the memory buffer accordingly.

21. The controller as claimed in claim 20, wherein when the microprocessor unit judges that the data stored in the integrated memory capacity of the first and the second system management areas is incorrect, the microprocessor unit reads the data stored in a first user data storage area and a first error correction area corresponding to the first system management area through the non-volatile memory interface, and uses an error correction code stored in the first error correction area to correct the data stored in the integrated memory capacity of the first and the second system management areas so as to establish the system information in the memory buffer accordingly.

22. The controller as claimed in claim 21, wherein the step of judging whether the data stored in the integrated memory capacity of the first and the second system management areas is correct or not comprises:

using the microprocessor unit to detect whether the system management information is correct or not according to the correction information whenever the non-volatile memory storage device is powered, wherein the system management information records at least a logical-to-physical mapping relationship of the first block, the correction information comprises at least an error detection code, and the error detection code comprises a cyclic redundancy check code.

23. The controller as claimed in claim 15, wherein the memory capacity of the first system management area is further integrated with memory capacities of other system management areas within the first page so as to integrate the memory capacities of all the system management areas within the first page.

24. The controller as claimed in claim 23, wherein the memory management method further comprises:

dividing an integrated memory capacity of all the system management areas within the first page into the system management data storage area and a system management data error correction area corresponding to the system management data storage area.

25. The controller as claimed in claim 24, the microprocessor unit would read and judge whether the data stored in the integrated memory capacity of all the system management areas within the start page is correct or not through the non-volatile memory interface, wherein when the microprocessor unit judges that the data stored in the integrated memory capacity of all the system management areas within the first page is correct, the microprocessor unit would establish the system information in the memory buffer accordingly.

26. The controller as claimed in claim 25, wherein when the microprocessor unit judges that the data stored in the integrated memory capacity of all the system management areas within the first page is incorrect, the microprocessor unit uses an error correction code stored in the system management data error correction area to correct the data stored in the integrated memory capacity of all the system management areas within the first page so as to establish the system information in the memory buffer accordingly.

27. The controller as claimed in claim 26, wherein the step of judging whether the data stored in the integrated memory capacity of all the system management areas within the first page is correct or not comprises:

using the microprocessor unit to detect whether the system management information is correct or not according to the correction information whenever the non-volatile memory storage device is powered, wherein the system management information records at least a logical-to-physical mapping relationship of the first block, the correction information comprises at least an error detection code, and the error detection code comprises a cyclic redundancy check code.

28. The controller as claimed in claim 15, wherein the first page is a start page.

29. A data storage device, characterized by:

the data storage device having a program code stored therein, and the program code performing a memory management method for a non-volatile memory of a non-volatile memory storage device when the program code is executed by a microprocessor, wherein the non-volatile memory comprises a plurality of blocks, each of the blocks comprises a plurality of pages, and each of the pages comprises a plurality of user data storage areas and a plurality of system management areas and error correction areas corresponding to the user data storage areas, the memory management method comprising:

dividing a memory capacity of at least a first system management area within a first page of the pages of at least a first block of the blocks into a system management data storage area and a system management data detection area corresponding to the system management data storage area, wherein the system management data storage area is used for storing a system management information and the system management data detection area is used for storing an correction information;

using a controller of the non-volatile memory storage device to read and judge whether the data stored in the first system management area is correct or not; and establishing a system information when the controller judges that the data stored in the first system management area is correct.

30. The data storage device as claimed in claim 29, wherein the memory management method further comprises:

when the controller judges that the data stored in the first system management area is incorrect, the controller reads the data stored in a first user data storage area and a first error correction area corresponding to the first system management area, and uses an error correction code stored in the first error correction area to correct the data stored in the first system management area so as to establish the system information in a memory buffer of the controller accordingly.

31. The data storage device as claimed in claim 30, wherein the step of judging whether the data stored in the first system management area is correct or not comprises:

using the controller to detect whether the system management information is correct or not according to the correction information whenever the non-volatile memory storage device is powered, wherein the system management information records at least a logical-to-physical mapping relationship of the first block, the correction information comprises at least an error detection code, and the error detection code comprises a cyclic redundancy check code.

32. The data storage device as claimed in claim 29, wherein the first page is a start page.

33. A non-volatile memory storage device, comprising:
a non-volatile memory comprising a plurality of blocks, each of the blocks comprising a plurality of pages, and each of the pages comprising a plurality of user data storage areas and a plurality of system management areas and error correction areas corresponding to the user data storage areas; and
a controller, comprising:
   a microprocessor unit used for controlling a whole operation of the controller;
   a non-volatile memory interface electrically connected with the microprocessor unit for accessing the non-volatile memory;
   a memory buffer electrically connected with the microprocessor unit for temporarily storing data; and
   a memory management module electrically connected with the microprocessor unit for managing the non-volatile memory, wherein the memory management module executes a memory management method for the non-volatile memory storage device, the memory management method comprising:
   dividing a memory capacity of at least a first system management area within a first page of the pages of at least a first block of the blocks into a system management data storage area and a system management data detection area corresponding to the system management data storage area, wherein the system management data storage area is used for storing a system management information, and the system management data detection area is used for storing a correction information;
   using the microprocessor unit to read and judge whether the data stored in the first system management area is correct or not through the non-volatile memory interface; and
   establishing a system information when the microprocessor unit judges that the data stored in the first system management area is correct.

34. The non-volatile memory storage device as claimed in claim 33, wherein the memory management method further comprises:
   when the microprocessor unit judges that the data stored in the first system management area is incorrect, the microprocessor unit reads the data stored in a first user data storage area and a first error correction area corresponding to the first system management area through the non-volatile memory interface, and uses an error correction code stored in the first error correction area to correct the data stored in the first system management area so as to establish the system information in a memory buffer accordingly.

35. The non-volatile memory storage device as claimed in claim 34, wherein the step of judging whether the data stored in the first system management area is correct or not comprises:
   using the microprocessor unit to detect whether the system management information is correct or not according to the correction information whenever the non-volatile memory storage device is powered,
   wherein the system management information records at least a logical-to-physical mapping relationship of the first block, the correction information comprises at least an error detection code, and the error detection code comprises a cyclic redundancy check code.

36. The non-volatile memory storage as claimed in claim 33, wherein the first page is a start page.

* * * * *